UNITED STATES PATENT OFFICE.

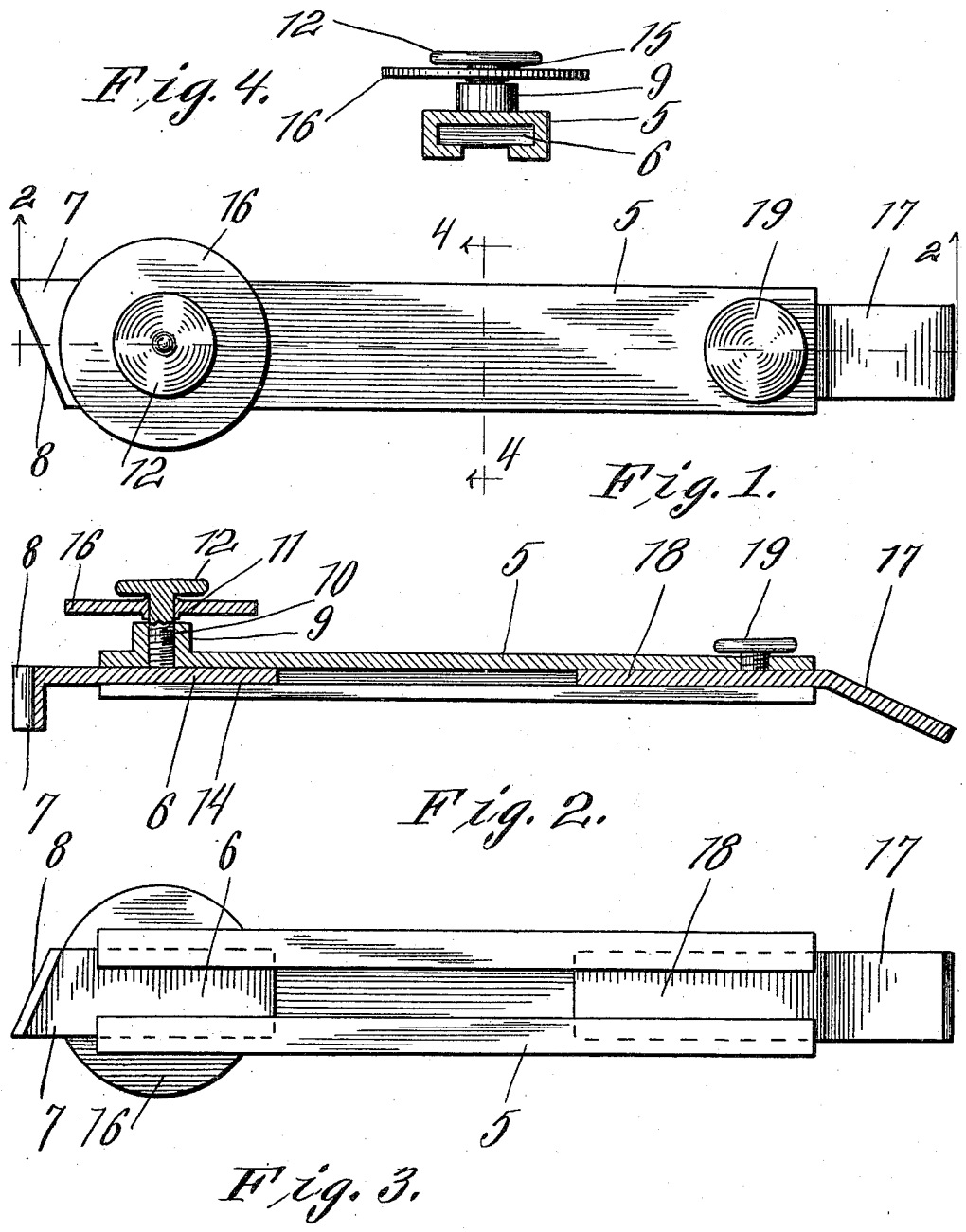

THOMAS E. STEPHENSON, OF PENBROOK, PENNSYLVANIA.

COMPOUND TOOL.

1,142,065.    Specification of Letters Patent.    Patented June 8, 1915.

Application filed January 23, 1915. Serial No. 3,935.

*To all whom it may concern:*

Be it known that I, THOMAS E. STEPHENSON, a citizen of the United States, residing at Penbrook, in the county of Dauphin and State of Pennsylvania, have invented certain new and useful Improvements in Compound Tools, of which the following is a specification.

My invention relates to improvements in raking tools, for leveling or smoothing the plastic material between bricks, stones, or the like and cleaning out the spaces occupied by the plastic material.

An important object of the invention is to provide a tool of the above mentioned character, formed of few and simple parts, which are adjustable and removable.

A further object of the invention is to provide means of the above mentioned character, which are extremely simple in construction, and inexpensive to manufacture.

A further object of the invention is to provide means of the above mentioned character, embodying a plow for leveling or smoothing the plastic material between the brick, which is so constructed that the same is not liable to be clogged with the plastic material, and which when worn or injured may be readily replaced by a similar device.

Other objects and advantages of the invention will be apparent during the course of the following description.

In the accompanying drawings forming a part of this specification and in which like numerals are employed to designate like parts throughout the same, Figure 1 is a side elevation of apparatus embodying my invention, Fig. 2 is a longitudinal sectional view taken on line 2—2 of Fig. 1, Fig. 3 is an elevation of the opposite side thereof, and, Fig. 4 is a transverse section taken on line 4—4 of Fig. 1.

My tool comprises a tubular handle or body portion 5, preferably formed rectangular in cross section, as shown. Longitudinally adjustable and removably mounted within the forward end of the tubular body portion 5 is a shank 6 of a plow 7, having an inclined plastic material engaging face 8, which smooths or levels off the same, and cleans or rakes out the space between the bricks or the like. Adjacent the shank 6, the tubular body portion 5 carries an outwardly extending boss 9, provided with a screw-threaded opening 10, receiving a clamping screw 11, carrying a head 12, by means of which it is turned. The clamping screw has its inner end adapted to engage with the shank 6, to lock the same against longitudinal movement with relation to the body portion 5, while a guide wheel 16 is rotatably mounted upon the outer smooth portion of the clamping screw.

The numeral 17 designates a striker, having a shank 18, which is longitudinally adjustable and removably mounted within the opposite end of the tubular body portion 5, and is held therein by a clamping screw 19, as shown.

In the use of the apparatus, the inclined plow 7 extends into the space between the bricks or the like, while the guide wheel 16 travels in engagement with the outer surface of the brick or bricks, thus positively limiting the extent of inward movement of the plow 7 into the space between the bricks. The apparatus is moved longitudinally within the space, with the plows 7 traveling therein in engagement with the plastic material, serving to smooth or level off the outer face thereof, and at the same time cleaning or raking out the space between the bricks. Owing to the inclined face 8 of the plow 7, I have found that the plastic material does not adhere thereto whereby the apparatus will not become clogged. The depth that the plow 7 will enter the space between the bricks when the apparatus is in use, depends of course upon the longitudinal adjustment of the shank 14 with relation to the handle 5. Particular attention is called to the fact that the clamping screw 11 serves not only as lock means for the shank 14 but to pivotally support the guide wheel 16.

It is to be understood that the form of my invention herewith shown and described is to be taken as a preferred example of the same, and that various changes in the shape, size, and arrangement of parts may be resorted to without departing from the spirit of the invention or the scope of the subjoined claim.

Having thus described the invention I claim:—

In apparatus of the character described, a tubular handle, a plow arranged at one end of the handle and extending transversely thereof and having a shank longitudinally adjustably mounted within the tubular handle, a clamping screw having an outer smooth portion and an inner screw-threaded portion having screw-threaded engagement with the tubular handle with its inner end adapted to contact with the shank to lock it in adjustment at the desired longitudinal position with relation to the tubular handle, and a guide wheel rotatably mounted upon the outer smooth portion of the clamping screw, substantially as described.

In testimony whereof I affix my signature in presence of two witnesses.

THOMAS E. STEPHENSON.

Witnesses:
JAMES B. MERSEREAU,
CHARLES CLAYTON CRANFORD.